United States Patent [19]
Keller et al.

[11] Patent Number: 5,138,010
[45] Date of Patent: Aug. 11, 1992

[54] FAST SWITCHING POLYSILOXANE FERROELECTRIC LIQUID CRYSTALS

[75] Inventors: Patrick J. Keller, Bures, France; David M. Walba, Boulder

[73] Assignee: University of Colorado Foundation, Inc., Boulder, Colo.

[21] Appl. No.: 543,160

[22] Filed: Jun. 25, 1990

[51] Int. Cl.$^5$ .............................................. C08G 77/04
[52] U.S. Cl. ........................................ 528/26; 528/21; 528/23; 528/25; 528/27; 528/31; 556/436; 252/299.01; 252/299.61
[58] Field of Search ..................... 528/27, 25, 31, 21, 528/23, 26; 556/436

[56] References Cited

U.S. PATENT DOCUMENTS

| | | | |
|---|---|---|---|
| 4,367,924 | 1/1983 | Clarke et al. | 350/334 |
| 4,561,726 | 12/1985 | Goodby et al. | 350/341 |
| 4,563,059 | 1/1986 | Clarke et al. | 350/330 |
| 4,638,073 | 1/1987 | Walba et al. | 549/556 |
| 4,639,089 | 1/1987 | Okada et al. | 350/341 |
| 4,705,874 | 11/1987 | Walba et al. | 549/557 |
| 4,763,995 | 8/1988 | Katagiri et al. | 350/341 |

FOREIGN PATENT DOCUMENTS

| | | |
|---|---|---|
| 0228703 | 12/1986 | European Pat. Off. |
| 0258898 | 9/1987 | European Pat. Off. |
| 0296571 | 6/1988 | European Pat. Off. |

OTHER PUBLICATIONS

Keller, P. (1988) Mol. Cryst. Liq. Cryst. 157:193–202.
Keller, P. (1990) Chem. of Materials 2:3–4.
Sato, K. et al. (1988) Makromol. Chem. Rapid Commun. 9:631–636.
Richard, H. et al. (1988) Mol. Cryst. Liq. Cryst. 155:141–150.
Mauzac, M. et al. (1986) Eur. Polym. J. 22:137.
Krone, V. and Ringsdorf, H. (1987) Liquid Crystals 2:411–422.
Hahn, B. and Percec, V. (1987) Macromolecules 20:2961.
Hahn, B. and Percec, B. (1988) Mol. Cryst. Liq. Cryst. 157:1252.
Shibaev, V. P. et al. (1984) Polym. Bull. 12:299–301.
Shivaev, V. P. et al. (XXXX) 30th IUPAC Macromol. Symp. (Abstract) p. 528.
Decobert, G. et al. (1985) Polym. Bull. 14:179.
Decobert, G. et al. (1986) Polym. Bull. 14:549.
Decobert, G. et al. (1987) Liquid Crystals 1:307.
Esselin, S. et al. (1987) Liquid Crystals 2:505.
Dubois, J. C. (1986) Mol. Crystl. Liq. Cryst. 137:349–364.
Uchida, S. et al. (1988) Mol. Cryst. Liq. Cryst. 155:93–102.
Bualek, S. et al. (1988) Mol. Cryst. Liq. Cryst. 155:47–56.
Keller, P. (1988) Ferroelectrics 85:425–434.
Suzuki, T. et al. (1988) Makromol. Chem. Rapid Commun. 9:755.
Scherowdky, G. et al. (1989) Liquid Crystals 5:1281.
Crivello, J. V. and Lee, J. L. (1989) Chem. of Materials 1:445–451.

*Primary Examiner*—Melvyn I. Marquis
*Attorney, Agent, or Firm*—Greenlee & Winner

[57] ABSTRACT

New ferroelectric liquid crystal (FLC) materials comprising linear and cyclic polysiloxanes are described. The FLCs exhibit high polarization and fast switching speeds. The disclosed polysiloxanes are derivitized with mesogenic groups which induce high polarization, specifically chiral nonracemic epoxide mesogens, having phenylbenzoate, reverse phenylbenzoate and biphenyl cores. These epoxy polysiloxanes are chemically stable over extended periods. Further, the epoxides can be crosslinked to produce FLC elastomers and like materials having optoelectronic applications. It was found that in the pure polysiloxanes, the smectic layers align along the rubbing direction of an anisotropic surface on contact with that surface. An unexpected alignment transition is observed as a function of polysiloxane concentration in polysiloxane/LC monomer mixtures with smectic layers orienting along the rubbing direction at high polymer concentrations and, typical of low molecular weight liquid crystals, normal to the rubbing direction at low polymer concentrations. A method for alignment of FLC polysiloxanes is described. The aligned polysiloxane FLCs and FLC mixtures exhibit high contrast electro optic switching.

42 Claims, 5 Drawing Sheets

FAST SWITCHING POLYSILOXANE FERROELECTRIC LIQUID CRYSTALS

This invention was made with at least partial support from the U.S. Government. The U.S. Government has certain rights in this invention.

INTRODUCTION

For many microelectronic and optoelectronic applications, organic thin films with controlled, polar orientation of functional groups relative to a substrate surface hold great potential. Several approaches to achieving such materials are currently under active investigation, including the growth of single crystal films (e.g., Itoh, H. al.(1986) Opt. Commun. 59:299–303), polar deposition of Langmuir-Blodgett multilayers (e.g., Popovitz-Biro, R. et al. (1988) J. Am. Chem. Soc. 110:2672–2674), electrically poled polymer films (Williams, D. J. (1984) Angew. Chem., Int. Ed. Engl. 23:690–703; Leslie, T. M. et al. (1987) Mol. Cryst. Liq. Cryst. 553:451–477), and self-assembled multilayers (Tillman, N. et al. (1988) J. Amer. Chem. Soc. 110:6136–6144). Such materials may also be achieved by use of liquid crystalline polymers.

During the past decade, a number of liquid crystalline polymers have been synthesized and characterized with respect to their thermodynamic and physical properties. These polymer liquid crystals include mesogenic groups in the main chain (Gordon, M. and platé, N.A. (eds.) (1984) *Adv. Polymer Sci.* "Liquid Crystal Polymers," p. 59), or as part of the side group (Ciferri, A. and Kirgbaum, W. R. (eds.) (1982) *Liquid Crystal Polymers*, Academic Press), or polymers with more complex structures (Engel, M. et al. (1985) Pure Appl. Chem. 57:1009).

A variety of liquid crystal polymers (LC polymers) having side chain mesogenic groups have been synthesized. Many reports relate to LC polymers based on a polyacrylate or polysiloxane polymer backbone.

Keller, P. (1988) Mol. Cryst. Liq. Cryst. 157:193–202 refers to polysiloxane LCs of the formula:

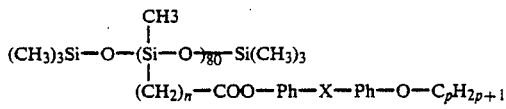

where X=COO or OOC; Ph=1,4 disubstituted phenyl group; n=4 or 10 and p=1-8. The chemical structure of the core of the mesogenic group (COO or OOC) and the length of the spacer are reported to have a more significant effect on liquid crystal properties of these polysiloxanes than does p, i.e., the size of the tail group.

Keller, P. (1990) Chem. of Materials 2:3–4 refers to photocrosslinking of LC polysiloxane polymers which contain mesogenic groups which incorporate a phenyl cinnamate moiety. The phenyl cinnamate group is described as a well-known photo-cross-linkable group. The LC polysiloxanes:

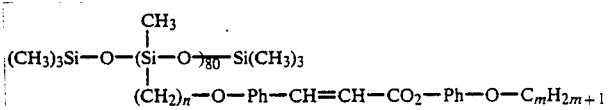

were cast as thin films on a quartz cell, annealed in the LC phase for several minutes, cooled to a glass and irradiated. The properties of the crosslinked elastomers are not further discussed.

Sato, K. et al. (1988) Makromol. Chem. Rapid Commun. 9:631–636 refers to a polysiloxane copolymer having the formula:

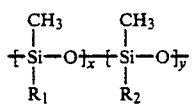

where $R_1$ is —$(CH_2)_3$—O—Ph—COO—Ph—$OC_6H_{13}$ and $R_2$ is —$(CH_2)_7$COO—Ph—Ph—CN, (P=1,4-substituted phenyl group), x:y=3:1 and x+y=40. The polymer is reported to have a smectic phase. The reference also notes that the application of electric fields to such polymers in the isotropic phase, followed by cooling can result in aligned films having certain optoelectronic properties, e.g. piezoelectric properties. In this case, application of a pulsating current, rather than an alternating current, to the polymer with cooling is reported to result in a piezoelectric film.

Richard, H. et (1988) Mol. Cryst. Liq. Cryst. 155:141–150 and Mauzac, M. et al. (1986) Eur. Polym. J. 22:137 refer to polymethylsiloxanes substituted with p-(polymethylen)oxy-phenyl p-substituted benzoates having the formula:

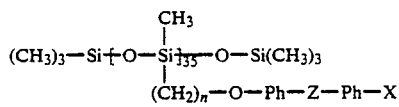

where n=3–11, Z=OCO, COO, OCH$_2$, and X=H, CH$_2$, OCH$_3$, NO$_2$ and CN. Most of the polymers are reported to have smectic A phases and several, in particular those with n=11 to have smectic C phases. It is reported that the smectic properties of these polymers increased with increasing spacer length.

Krone, V. and Ringsdorf, H. (1987)2:411–422 refers to LC monomers, dimers and side group polymers containing phenylpyrimidine achiral mesogen groups. In particular, polysiloxanes of the formula:

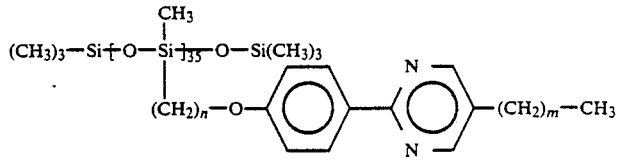

where m and n are 1 and 6, 2 and 6, 7 and 6, 2 and 3, or 2 and 11, respectively. The polysiloxanes where n and m are 7 and 6, 2 and 3 or 2 and 11, respectively are reported to have unspecified smectic phases, while the remaining exemplified polysiloxanes displayed nematic phases. In these polysiloxanes, increasing the length of the spacer, i.e., $(CH_2)_n$, did not correlate with the presence of smectic phases. This reference also describes the synthesis of polyacrylates and polymethacrylates having similar phenylpyrimidine mesogenic groups.

Hahn, B. and Percec, V. (1987) Macromolecules 20:2961 refer to side-chain smectic liquid crystalline linear polysiloxanes and copolysiloxanes having the formula:

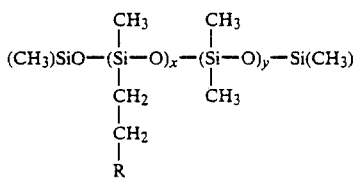

where R=trans-2-[p-(11-undecanyloxy)phenyl]-5-[p-(2(S)-methyl-1-butoxy)-phenyl]-1,3-dioxane, trans-2-2-[p-(2(S)-methyl-1-butoxy)-phenyl]-5-(11-undecanyl)-1,3-dioxane, and 2-[4-(2(S)-methyl-1-butoxy)-phenyl]-5-(11-undecanyl)-1,3,2-dioxaborinane when x=80 and y=0 and R=2-[4-(2(S)-methyl-1-butoxy)-phenyl]-5-(11-undecanyl)-1,3,2-dioxaborinane when x=13 and y=27 and x=5 and y=25. Hahn, B. and Percec, V. (1988) Mol. Cryst. Liq. Cryst. 157:1252 additionally refer to linear polysiloxanes having R=2-[4-(2(S)-methyl-1-butoxy)-phenyl]-5-( -alkyl)-1,3,2-dioxaborinane where the alkyl group is hexyl, octyl or undecyl and also to cyclic polysiloxanes substituted with the same mesogenic group. Four bornane mesogenic groups are attached to 1,3,5,7-tetramethylcyclotetrasiloxane. The reference provides no properties of the cyclic material other than that it appeared to have discotic type mesophases.

Due to the useful physical properties of polymer films and the spontaneous polar order present in ferroelectric liquid crystal assemblies, efforts have recently been directed toward the synthesis of ferroelectric liquid crystal polymers (FLCPs). In FLCPS a permanent electric dipole density is obtained by incorporation of chiral side groups to form a tilted chiral smectic phase analogous to those formed by low molecular weight liquid crystals. Of particular interest is the potential of FLCPs for application in the fast switching, bistable surface stabilized ferroelectric liquid crystal (SSFLC) electrooptic devices (Clark, N. A. and Lagerwall, S. T. (1980) Appl. Phys. Lett. 36:899; Clark, N. A. and Lagerwall, S. T. (1984) Ferroelectrics 59:25; Clark, N. A. and Lagerwall, S. T. U.S. Pat. Nos. 4,367,924 and 4,563,059).

A number of LC polymers with chiral side chains have been reported.

Shivaev, V. P. et al. (1984) Polym. Bull. 12:299–301 refer to "comb-like" polymers having the structure:

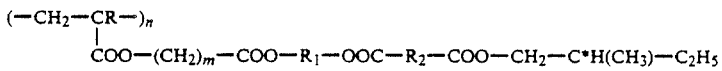

where m=6–12, the mesogenic group of which have an asymmetric carbon, as indicated by "*" with R groups and n unspecified. These materials are said to form chiral smectic C* phases. The same authors (Shivaev, V. P. et al. (XXXX) 30th IUPAC Macromol. Symp. (Abstracts) page 528) refer to FLC polymethacrylates having the formula:

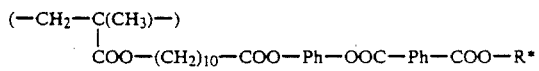

where Ph is a 1,4 substituted phenyl ring and R* is a chiral group.

Decobert, G. et al. (1985) Polym. Bull. 14:179; Decobert, G. et al. (1986) Polym. Bull. 14:549; Decobert, G. et al. (1986) Liq. Cryst. 1:307; Esselin, S. et al. (1987) Liq. Cryst. 2:505; and Dubois J. C. et al. (1986) Mol. Cryst. Liq. Cryst. 137:349–364 variously refer to polyacrylates, polymethacrylates and poly α-chloroacrylates of the formula:

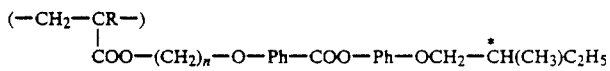

where n=2, 6 or 11 and R=H, $CH_3$ or Cl and where Ph is a 1,4-substituted phenyl ring. Dubois, J. C. et al. (1986) supra also refers to side-chain polymers of the formula:

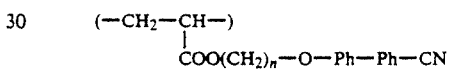

where n=2–6 and Ph is a 1,4 substituted phenyl ring.

Uchida, S. et (1988) Mol. Cryst. Liq. Cryst. 155:93–102 refers to polyacrylate smectic liquid crystal polymers having the formula:

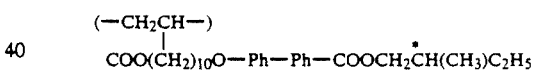

with molecular weights ranging from 1,900 to 42,300. Uchida, S. et al. European Patent Application 228,703, refers to polyacrylate ferroelectric liquid crystal polymers comprising recurring units of formula:

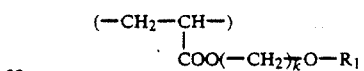

where k is an integer from 1 to 30; $R_1$ is —Ph—Ph—$R_2$, —Ph—COO—Ph—$R_2$, —Ph—COO—Ph—Ph—$R_2$ or —Ph—Ph—COO—Ph—$R_2$, where Ph is a 1,4 substituted phenyl ring and $R_2$ is —$COOR_3$, —$OCOR_3$, —$OR_3$, or —$R_3$ $OR_3$, or —$R_3$ in which $R_3$ has the formula:

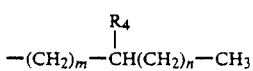

where $R_4$ is $CH_3$ or Cl; m is 0 or an integer from 1 to 10; n is 0 or an integer from 1 to 10 except that n is not 0, when $R_4$ is $CH_3$. A number of these FLC polymers are reported to display smectic C phases. The FLC polymers are also reported to have electric field response times ranging from 0.2 to 0.18 sec dependent of the specific structure of the side chain.

Morita, K. et al. European Patent Application 258,898 refer to FLC polymers having smectic C* phases and fast switching speeds which have the repeating unit:

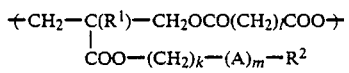

$R^2$ includes among others phenylbenzoates, biphenyl and reverse phenylbenzoates with chiral tail groups with one or two asymmetric carbons, for example among many others, 2-chloro-3-methylpentylesters. Spontaneous polarization strengths ranging from 40 to 214 $nC/cm^2$ are reported.

Bualek, S. et al. (1988) Mol. Cryst. Liq. Cryst. 155:47-56 refers to crosslinked liquid crystal polymers in which a main chain polymer, for example:

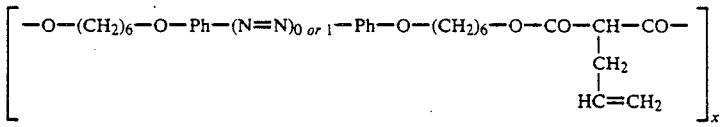

is crosslinked using a crosslinking agent, for example the siloxane:

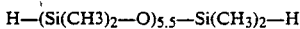

These authors also describe uncrosslinked main chain-/side chain group polymers which contain chiral chloroalcohol groups:

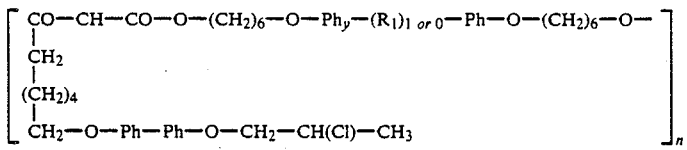

where Ph is a 1,4 substituted phenyl group, $Ph_y$ is a 1,4 substituted phenyl group which may have 2-Br group and where $R_1$ is —N=N— or —N=N(O)—.

Keller, P. (1988) Ferroelectrics 85:425-434 describes the synthesis of polysiloxanes having chiral 4'-(omegaalkenoyloxy)phenyl-4-((S)4-methylhexyloxy)-benzoate side chains of formula:

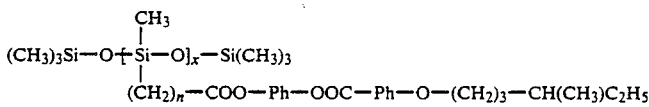

where x=80 and n=4,6, or 10, x=36 and n=10 or x=25 and n=10. All of these polymers with n=10 exhibit smectic C* phases.

Suzuki, T. et al. (1988) Makromol. Chem. Rapid Commun. 9:755 refers to FLC polymers having the formula:

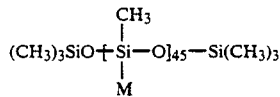

where M=—R—O—Ph—COO—Ph—COO—CH-2—C*H($CH_3$)$C_2H_5$ and R is —$(CH_2)_n$— with n=6, 10 or 11 or R is —$(CH_2)_3$—O—$(CH_2)_n$— with n=6 or 8. Polymers with R=—$(CH_2)_n$— exhibit a smectic C* phase at room temperature. The polymers are positioned between transparent electrodes with rubbed polyimide orienting layers to measure electro optic response time. The polymers are described as showing less than 1 sec response times with spontaneous polarization of about 6 to 8 $nC/cm^2$.

Liquid crystal cells incorporating polysiloxane LCs of formula:

where M=$(CH_2)_n$—O—Ph—Ph—COOCH$_2$C*H(CH$_3$)—$C_2H_5$ with n=10, 8 or 6 or M=$(CH_2)_6$—O—Ph—COO—Ph—CN were reported in Yuasa, K. et al. European Patent Application 296,571. Response speeds for FLC cells containing the polysiloxane with the chiral side chain are reported to be 0.35 to 0.2 sec.

Scherowsky, G. et al. (1989) Liq. Cryst. 5:1281 have reported polysiloxane having a three-ring side chain mesogenic group with a chiral chloroester tail (—O-CO—C*H(Cl)—C*H(CH$_3$)—$C_2H_5$) which did not display a smectic C phase.

Crivello, J. V. and Lee, J. L. (1989) Chem. of Materials 1:445-451 refer to cyclic polysiloxanes substituted with organoepoxy-side chains, e.g. 4-vinyl-cylcohexene monoxide. These monomers are describes as having possible application as substrates for UV-curable coatings. Clear, hard, tack-free films are prepared by UV irradiation of the epoxide-derivitized cyclic polysiloxanes in the presence of a photoinitiator.

In general, ferroelectric liquid crystal optical devices have two optical states. The device is switched between these two states typically by application of an electric field. One of the optical states is correlated with the molecular orientation of the liquid crystal (with respect to the applied field). Most often the LC material must be contacted with an order-inducing substance, usually coated on the transparent electrodes of the device, to achieve the desired molecular orientation or alignment within the device. Clark and Lagerwall U.S. Pat. No. 4,367,924 have described that the desired alignment can be achieved by application of an electric field, application of shear perpendicular to the direction of alignment or introduction of a set of parallel ridges between the electrodes. Okada, S. et al. U.S. Pat. No. 4,639,089 describe the use of rubbed surfaces to align LCs having a cholesteric phase above a smectic A phase. Goodby, J. W. et al. U.S. Pat. No. 4,561,726 describes the use of certain order-inducing substances such as polyimides, polyamides and polyesters which are coated on the transparent electrode. The order-inducing material is rubbed or rolled in one direction to induce the desired order. The isotropic LC material introduced between such rubbed coated electrode and cooled through the smectic A phase is found to align with smectic layers perpendicular to the direction of rubbing to the rubbing direction. Katagiri, K. et al. U.S. Pat. No. 4,763,995 describes the use of a cell having an orientation inducing-coating and parallel ridges to achieve alignment. It is unclear if such alignment methods that have been applied to FLC monomers can be employed to align FLC polymers.

Yuasa, K. et al. European Patent Application 296,571 refers to liquid crystal optical devices having an oriented liquid crystalline polymer which exhibits a smectic C phase. The reference refers to orientation of the LC polymer by a coating method or by a uniaxial stretching method. The coating method involves the use of a coating bar moving forward or forward and back to apply the LC material to the electrode. Stretching of the polymer under certain conditions is also said to orient the polymer. Also described is a stretching method in which a laminate of the LC polymer between layers of polyethyleneterephthalate substrate carrying an ITO conducting layer is formed and then stretched to achieve a certain stretch ratio and orient the LC. The methods were exemplified for certain polysiloxanes.

SUMMARY OF THE INVENTION

It is an object of the present invention to provide liquid crystal materials, particularly ferroelectric liquid crystal materials and most particularly linear and cyclic polysiloxane FLC materials. It is also an object of this invention to provide polymers having thermodynamically stable polar order in a non-crystalline state, for example, polymer glasses having polar order. Such poled polymer materials find use in pyroelectric, piezoelectric and non linear optics (NLO) applications.

More specifically, it is an object of the present invention to provide fast-switching, stable ferroelectric liquid crystal optical devices which employ mesogen derivitized polysiloxane FLC materials.

To achieve these and other objects, the present invention provides linear and cyclic polysiloxanes having mesogenic groups which incorporate chiral nonracemic tail units which confer high polarization on the polysiloxane materials. Particularly provided are polysiloxanes having high polarization mesogenic groups with epoxy alcohol tail units and LC core units that are phenylbenzoates, reverse phenylbenzoates and biphenyls.

More specifically, polysiloxane FLC materials are provided which incorporate a chiral, nonracemic mesogenic group M having the formula:

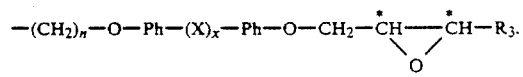

where x is 0 or 1 and X is —OOC— or —COO—; Ph is a 1,4 substituted phenyl group; n is an integer from about 6 to 12; and $R_3$ is a straight chain or branched alkyl group having six or less carbon atoms and "*" indicates an asymmetric carbon.

The present invention provides both cyclic and linear polysiloxane FLCs, the formula of which can be generally represented as I:

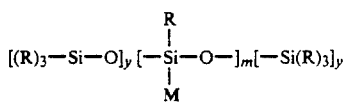

where M is a chiral, nonracemic mesogenic group as defined above; R is a small alkyl group, i.e., one having from 1 to 3 carbon atoms; y is either 0 or 1 and m is a number ranging from about 4 to about 100. When the FLC is a linear polysiloxane, y=1 and m is preferably about 10 to about 100 and m is more preferably about 20 to about 80. When the FLC is a cyclic polysiloxane, y=0 and m is preferably about 4 to about 10. For both cyclic and linear polysiloxanes R is preferable a methyl or ethyl group and is most preferably a methyl group.

The present invention provides polysiloxane FLC polymers and copolymers. Polysiloxane copolymers are represented by the formula, II:

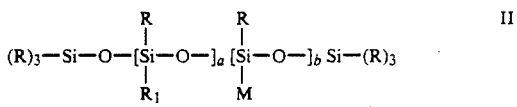

where M is a chiral nonracemic mesogenic group as defined above; R is a small alkyl group, i.e., one having one to three carbons; and $R_1$ is a straight-chain alkyl group having from one to about six carbon atoms or $R_1$ is a mesogenic group, different from M, which is optionally a chiral nonracemic mesogenic group. The extent of substitution of the polysiloxane is defined by a and b which are numbers greater than 0. The average degree of polymerization of the polysiloxane is a+b, which can range from about 10 to about 100, with a=the average number of Si atoms of the polymer which are substituted with $R_1$ and b=the average number of Si atoms that are substituted with the chiral nonracemic mesogenic group M. Thus, a/(a+b) 100 is the average percent substitution of the polysiloxane with $R_1$ and b/(a+b) 100 is the average percent substitution of the polysiloxane with M. Polysiloxane FLCs of the present invention preferably are at least about 5% substituted with a chiral nonracemic mesogenic group M, thus b/(a+b) is about 0.05 or greater.

The polysiloxanes of the present invention are preferably those incorporating epoxy mesogenic groups having high polarization, i.e, those incorporating a chiral nonracemic trans-2,3-epoxide tail which can be predominantly the (2R,3R) or the (2S,3S) configuration. Preferred mesogenic groups have $R_3$ which contains 3 to 6 carbon atoms, with those having $R_3$ that is n-propyl being more preferred. Mesogenic groups which are phenylbenzoates are more preferred.

The length of the flexible spacer, in this case $(CH_2)_n$, which separates the mesogenic moiety from the polymer main chain can affect the liquid crystal properties of a substituted polysiloxane. Polysiloxanes (linear, cyclic and copolymers) of the present invention preferably contain a smectic C* phase. Polysiloxanes having epoxy mesogen groups in which n=8 to 12 are preferred with, those in which n=9 or 10 being most preferred.

As stated above, polysiloxane FLC materials having smectic C* phases are preferred. For certain applications of FLCs it is preferred that the FLC material also have a smectic A phase. For example, the presence of a smectic A phase above the smectic C* phase can be useful in alignment of FLC materials for use in FLC devices. Desirable liquid crystal properties can also be obtained by mixing the polysiloxane FLC materials of the present invention with known FLC hosts. Such mixtures can, for example, display liquid crystal transition temperatures different from those of the polysiloxane FLC or can display additional liquid crystal phases other than those of the polysiloxane FLC.

The bulk viscosity of an FLC material can affect the ease of preparation and alignment of FLC cells. Thus, lower viscosity materials, i.e those with a lower degree of polymerization, may be preferred for certain applications.

Polysiloxane FLCs of the present invention are preferably prepared by hydrosilyation of the polyhydrogenalkylsiloxanes with an alkene precursor of the mesogenic group. Polysiloxanes of the present invention can retain up to about 5% unreacted Si—H groups without significant effect on functionality as FLCs. Polysiloxane copolymers of the present invention are likewise preferably prepared by hydrosilyation of polyhydrogenalkylsiloxane copolymers. Copolymer polysiloxane FLCs of the present invention can retain up to about 5% unreacted Si—H groups without significant effect on functionality. To insure most complete reaction of Si—H groups, derivitized polysiloxanes of the present invention can optionally be reacted with an appropriate capping agent, for example, an alkene. Such capping agents are well-known to the art.

This invention specifically provides linear and cyclic polysiloxanes having chiral nonracemic mesogenic groups which are epoxyphenylbenzoates of formula, Ia or IIa:

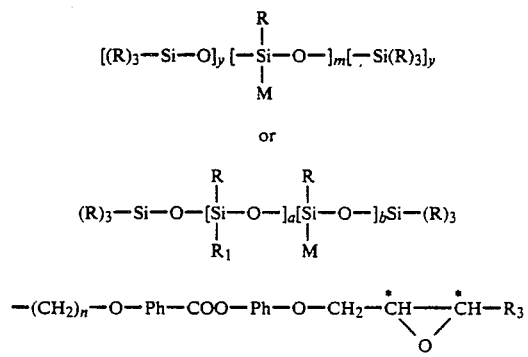

where, in both Ia and IIa, R is a small alkyl group, i.e., one having one to three carbons; Ph is a 1,4 substituted phenyl group; n is an integer from about 6 to 12; and $R_3$ is a straight chain or branched alkyl group having six or less carbon atoms; and "*" indicates an asymmetric carbon. In Ia, y and m are as defined above for formula I, i.e., y=0 and m=about 4 to about 10 for cyclic polysiloxanes; y=1 and m is a number between about 10 and 100 for linear polysiloxanes. In IIa, $R_1$ is a straight-chain alkyl group having from 1 to about 6 carbon atoms or $R_1$ is a mesogenic group, different from M, which is optionally a chiral nonracemic mesogenic group. The extent of substitution of the polysiloxane, IIa, is defined by a and b which are as defined above i.e. a+b is between about 10 and about 100 and b/(a+b) is 0.05 or greater.

A significant advantage of the epoxy polysiloxanes of the present invention is that in addition to imparting high polarization to the FLC phase, the epoxy mesogenic groups are also reactive for crosslinking. Epoxy polysiloxanes can be crosslinked, for example, by application of U.V. irradiation in the presence of photoinitiators to result in crosslinked elastomers. Such elastomers can be formed into desired shapes. FLC elastomers can be aligned, for example, by application of stretching. FLC polysiloxanes can also be aligned for example by the application of magnetic or electric fields. Combination of such alignment with crosslinking can result in oriented films or the like which have electro optic application. The degree of crosslinking of the polymer must be balanced if it is desired that the liquid crystalline properties of the material are retained in the resulting crosslinked materials. Crosslinking of the epoxy polysiloxanes can also result in poled polymer materials having desirable structural features. Such poled polymers will find use for preparation of their films, wave guides and the like for electro optic applications. Thus, elastomers, crosslinked glasses and like materials obtained by crosslinking of the polysiloxanes of the present invention are considered to also be within the scope of this invention. Certain of the polysiloxanes and crosslinked polysiloxanes of this invention exhibit glassy states having thermodynamic stable polar order which are useful in the preparation of optical quality films for electro optic and NLO applications.

In order to provide FLC devices incorporating polymer FLCs, the present invention also provides a method for aligning FLC polymers, particularly polysiloxanes FLCs, and mixtures of FLC polymers with monomeric LCs to produce bistable FLC switching devices.

The alignment method is based on the discovery that smetic layers of pure FLC polymers or mixtures of the polymers with monomeric LCs in which the polymer is about 50% or more by weight of the composition align parallel to the rubbing direction of an anisotropic surface, such as rubbed nylon. A rubbed surface is only one type of order-inducing anisotropic surface that can be employed to induce partial FLC alignment. Any order inducing substances which induce alignment of monomeric FLC's can be employed. On contact with such order inducing substances, the linear polysiloxane FLC's of the present invention and mixtures containing 50% or more by weight of such polysiloxanes will align perpendicular to the orientation induced in monomeric FLCs. In contrast, monomeric FLCs align perpendicular to the rubbing direction of such an anisotropic surface. Mixture of polymers with monomeric FLCs in which the polymer is less than about 50% by weight of the composition align perpendicular to the rubbing direction as expected for FLC monomers. Perfect planar orientation of the polysiloxanes and mixtures of the polysiloxanes with monomer LCs comprising about 50% or greater of the polysiloxane is achieved by heating the FLC polysiloxane or polysiloxane mixture to the isotropic phase, and introducing the isotropic FLC between appropriate substrates having an anisotropic surface which is oriented in a selected direction by rubbing, i.e., the rubbing direction $\hat{z}$. A shear is then applied along the selected direction as the FLC is cooled to the smetic phase. Shear is applied parallel to until the desired alignment of the layers along the direction $\hat{z}$ is achieved.

DETAILED DESCRIPTION OF THE INVENTION

Figure 1:
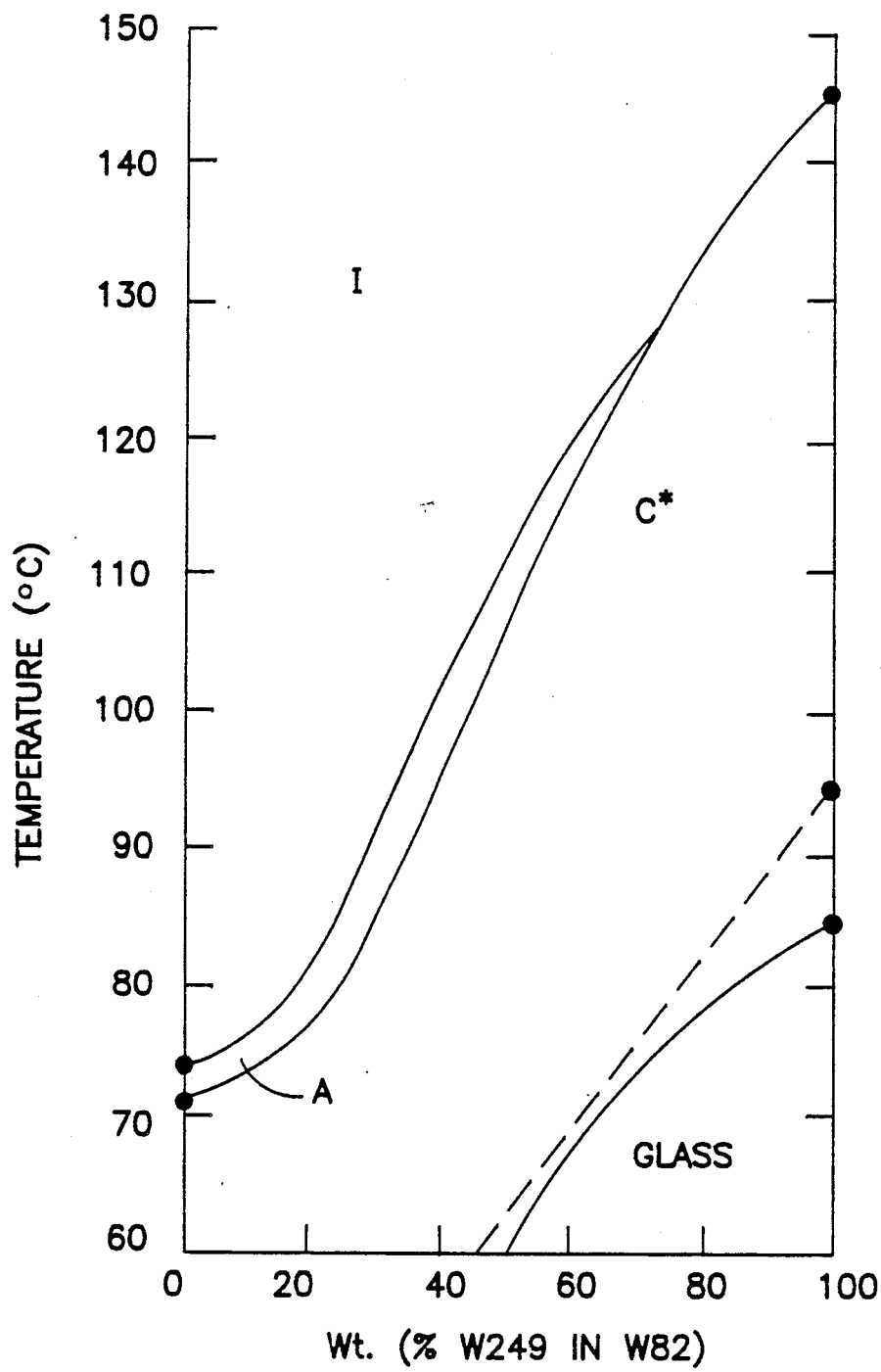
FIG. 1 is a phase diagram for mixtures of W249 with W82 as a function of weight % of W249. I indicates isotropic phase, A indicates smectic A phase, C* indicates smectic C* phase, the transition to the crystalline phase is indicated by a dashed line. The glassy phase resulting on supercooling from the smectic C* is indicated.

Ferroelectric liquid crystal monomers having phenylbenzoate or biphenylcores and (2,3) epoxyalkyl methanol chiral tail groups were described by Walba, D. M. and Vohra, R. in U.S. Pat. Nos. 4,638,073 and 4,705,874. These FLC monomers exhibited high ferroelectric polarization density.

The FLC polysiloxanes of the present invention are prepared by hydrosilyation of chiral nonracemic mesogens, which are phenylbenzoates or biphenyls having chiral, nonracemic (2,3) epoxyalkyl methanol tails and with an achiral tail that is an cmega-alkene, with polyalkylhydrosiloxanes, polyalkylhydrosiloxane copolymers and cyclic polysiloxanes.

A variety of polyalkylhydrosiloxanes, and polyalkylhydrosiloxane copolymers are readily available from commercial sources or by preparation by known methods. Polyalkylhydrosiloxanes including polymethylhydrosiloxanes with varying degrees of polymerization are readily available. Polyalkylhydrosiloxanes are most often mixtures of different length polysiloxanes which are described by an average degree of polymerization.

A polysiloxane can be described as having an average molecular weight or as having a range of molecular weights. The average degree of polymerization of the polysiloxane can be calculated from the average molecular weight of the polysiloxane. Similarly, polysiloxane copolymers are most often mixtures of copolymers which are described by an average molecular weight and/or degree of polymerization. For the polysiloxanes described herein in formula I, m is the degree of polymerization of the polysiloxane. In formula II, a+b is the degree of polymerization. It is intended herein that m and a+b as used in formulas I and II, respectively, refer to a pure polysiloxane having the specific degree of polymerization given as well as mixtures of polysiloxanes having m or a+b as the average degree of polymerization.

Copolymer polysiloxanes are additionally defined in terms of percent substitution by a given side group. Copolymers are mixtures so that percent substitution is most often given as a range.

Copolymer polysiloxanes can also be prepared by hydrosilyation of a mixture of alkenes including the alkene precursor of the desired mesogenic group and other alkene precursors of desired side groups (R$_1$). This method is preferred when the alkene side group precursors are similar in reactivity with Si—H bonds. The alkenes are mixed in the desired ratio and reacted with the polysiloxane. If the alkenes are significantly different in reactivity with Si—H, then addition of the desired side group can be done sequentially by reaction of the polysiloxane with an amount of each alkene precursor that will give the desired side group ratio in the product. Only routine experimentation is required to determine the amounts or relative amounts of alkenes required to achieve a desired side group ratio.

With polysiloxanes the degree of polymerization is selected to achieve desired structural or physical properties which are determined by the desired application. For example, polysiloxanes of lower degree of polymerization are less viscous than those having a higher degree of polymerization. In general, liquid crystal properties do not significantly vary with degree of polymerization as long as the degree of polymerization is greater than about 10.

With copolymer materials, the degree of polymerization and the percent substitution of a side group can be varied to achieved desired structural and physical properties. The FLC properties of the material will be affected by the degree of substitution by chiral mesogenic groups so it is preferred that the chiral mesogen be at least about 5% of the side chain groups in the copolymer.

Cyclic polysiloxanes are available as mixtures with varying ring sizes or as pure or essentially pure compounds having a definite ring size. When obtained as a mixture, the cyclic polysiloxane is most often described using the dominant ring size in the mixture. Ring size varying from about 4 to 10 can be selected to achieve desired structural or physical properties.

The epoxide derivitized polysiloxanes of the present invention are chemically stable and are expected to be more stable, for example, than high polarization chloroester based mesogens.

The epoxide derivitized polysiloxanes of the present invention can be reacted to give crosslinked polymers having desired structural and physical properties. It may be desirable to retain liquid crystal properties in the crosslinked polymer and so the degree of crosslinking must be adjusted accordingly to retain the desired liquid crystal phases. Crosslinking can also result in materials which are poled noncrystalline polymers and such material need not retain liquid crystal phases.

The properties of FLC polysiloxanes of formula I and Ia are illustrated herein by those of W249 (I, where R is a methyl group; y is 1 and m is about 80; and M is

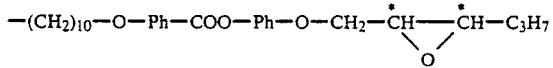

where Ph is a 1,4 substituted phenyl group and where the configuration of the chiral nonracemic epoxy tail is 2S, 3S.

The phase transition temperatures for W249 are given in Example 2. The phase identification was done using polarizing microscopy. On cooling from the isotropic liquid phase, W249 undergoes a phase transition to the C* phase at 147° C. and continues in this phase until 85° C., below which it undergoes a glass transition which is maintained down to room temperature. The glass phase has not been observed to crystallize even after storage for several weeks at room temperature. Since W249 is formed as a crystalline solid at room temperature, the glassy state is believed to be supercooled from the smectic C* phase.

The miscibility of the polymer ferroelectric liquid crystal W249 with a monomeric FLC smectic C host material W82 has been tested. W82 is a low polarization FLC material, 4'[(S)-(4-methylhexyl)oxy]phenyl-4-(decyloxy)benzoate, which has been employed as a smectic C* FLC host material for high polarization FLC dopants. For example, mixtures of W82 with chiral nonracemic phenylbenzoate 1-cyanoalkoxy compounds are found to be FLC materials having high polarization and fast switching speeds, see Eidman, K. P. and Walba, D. M. U.S. Pat. No. 4,777,280.

FIG. 1 is the phase diagram for mixtures of W82 and W249. The polysiloxane and smectic C host material are unexpectedly miscible in the entire range of polymer FLC concentrations as shown in FIG. 1. Mixtures containing about 80% or less by weight of W249, display a narrow (in temperature) smectic A phase which continues through the entire range towards increased W82 concentration. The smectic C* phase is quite broad in all the W249-W82 mixtures examined.

PREPARATION OF FLC SWITCHING ELEMENTS INCORPORATING POLYSILOXANE FLCS: ALIGNMENT OF POLYMER FLCS

In smectic polymer side chain liquid crystals, the side groups are organized into layers, much like monomeric smectics, while the backbone chains are confined largely to lie in the layering planes. Thus, the molecular orientation induced by contact with an anisotropic surface treatment will depend on which part of the polymer molecule is most strongly coupled to the surface anisotropy. An anisotropic surface (e.g., rubbed nylon) which orients the backbone parallel to a particular direction ($\hat{z}$) in the surface will induce smectic layers parallel to $\hat{z}$. If, on the other hand, the coupling is primarily to the side groups, then, as in monomer liquid crystals, the side chain molecules line up along $\hat{z}$ forming the smectic layers perpendicular to $\hat{z}$.

An unexpected result was observed with the linear polysiloxane side chain polymer-monomer liquid crystal mixtures of the present invention. A transition between two alignment modes, dependent on the concentration of polysiloxane in the FLC mixture, was observed. FLC layers formed parallel to $\hat{z}$ at high polysiloxane concentration, while layers formed perpendicular to $\hat{z}$ at low polymer concentration.

As described in Example 10, alignment of the polymer polysiloxane FLC samples was first attempted by creating anisotropic surfaces on the glass plate electrodes comprising the FLC cell. Nylon surface-coated glass plates were brushed in one direction, $\hat{z}$ (the rubbing direction), to create the anisotropic surface, and assembled such that the rubbing direction of the two surfaces was parallel. Isotropic polymer FLC W249 was then introduced between the spaced, brushed ITO-coated glass plates. The cell produced, however, did not completely extinguish light passage when placed between crossed polarizer. This was true even at temperatures in which the pure W249 was isotropic. This result indicates that in thin cells (i.e., about 0.5 to about 5.0 μm) the FLC polymer is partially oriented by the surface anisotropy even in the isotropic phase.

It was discovered that perfect planar orientation of the FLC polymer in the SSFLC geometry (FIG. 2) could be obtained by application of shear parallel to the rubbing direction ($\hat{z}$), Example 10. The isotropic FLC material was introduced between plates having an anisotropic surface. Simultaneous cooling and shearing of the polymer FLC parallel to the rubbing direction resulted in an aligned surface stabilized cell. Application of an electric field to that cell in appropriate direction switched the sample between the bight and dark surface stabilized states. The cell was bistable, either state remaining even when the field is removed.

With pure W249, the alignment in the FLC cell produced by shear application was maintained even below the glass transition (85° C.) temperature. Upon cooling the aligned cell under a d.c. field ($\sim 10^7$ V/m) to room temperature, it was found to be poled: a voltage of $\sim 0.6$ V was measured across the cell upon removal of the external voltage source at room temperature. A further important aspect of the cell produced by shear alignment, as described above, with W249 was the absence of undesirable zig-zag walls (Rieker, T. P. (1987) Phys. Rev. Lett. 59:2658).

Aligned FLC cells were also prepared by the method of Example 10, with mixtures of W249 and the LC monomer W82. As the concentration of W249 in the mixture was decreased, the layer alignment shifted from layers parallel to the rubbing direction to layers perpendicular to the rubbing direction. The crossover, or transition, between these two alignment modes occurred with an approximately 1:1 (by weight) mixture. This result may be compared to the alignment of monomer FLC's where shearing normal to the rubbing direction leads to good alignment. At low polymer concentration, the usual alignment of smectic layers normal to the rubbing is observed.

As noted in Example 10, an aligned cell was also prepared using a mixture of 20% (by weight) of W249 in W82. Again, partial alignment of the FLC mixture was obtained on contact of the sample with the anisotropic surfaces of rubbed nylon coated glass plates. In contrast to pure W249, the smectic A layers of the mixture were formed perpendicular to direction of rubbing ($\hat{z}$) as is typical for monomer liquid crystals. Application of shear perpendicular to the rubbing direction was required to perfect alignment of the layers perpendicular to $\hat{z}$. The zig-zag wall defects commonly observed in monomeric FLC cells were observed in this case.

An aligned FLC cell was also prepared using a 1:1 weight ratio of W249 and W82. In this case, two distinct focal conic orientations were observed: one parallel to the direction of rubbing ($\hat{z}$) and the other perpendicular to $\hat{z}$. However, more focal conics were observed to be oriented perpendicular to the rubbing direction than along it. It was discovered, for the 1:1 mixture, that shear alignment of the layers along the rubbing direction, $\hat{z}$ was more easily achieved and in addition that such alignment produces a cell with fewer defects than when the layers are shear aligned perpendicular to the rubbing direction. The resulting alignment was good and planar with only a small number of defects seen in the form of black lines. Again, no zig-zag wall defects were observed. This sample was surface-stabilized and bistable as for pure W249, and a glassy state resulted upon cooling the 1:1 mixture to room temperature as observed with W249.

Polarization and Tilt Angle Measurements

Figure 2:
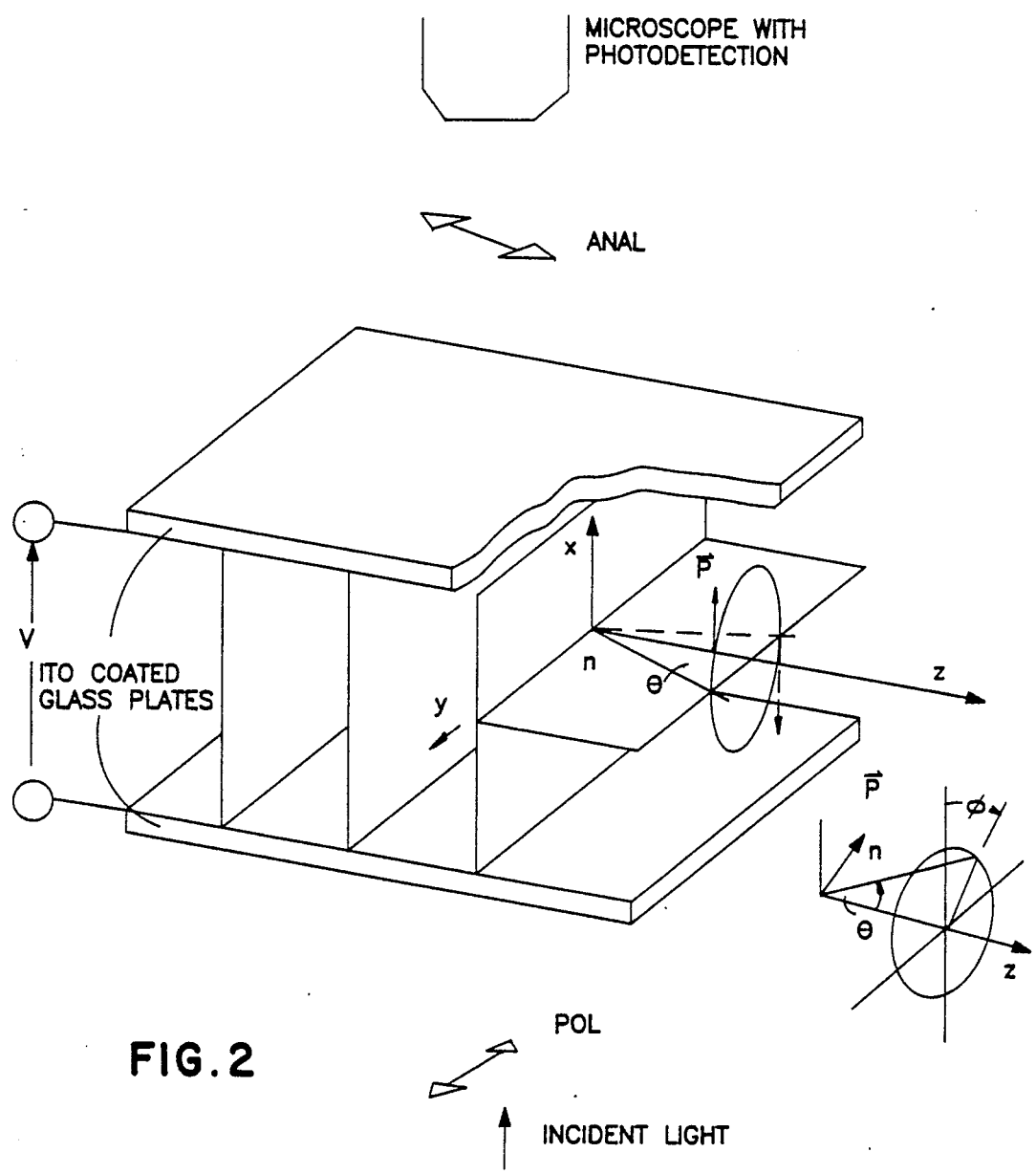
FIG. 2 is a diagram of the sample FLC cell geometry employed for tilt angle and polarization measurements.

The typical sample geometry for the measurements of polarization and tilt angle is shown in FIG. 2.

FLC cells were prepared with polysiloxanes and their mixtures as described in Example 10. Tilt angle and polarization measurements were done as described in Example 11.

Figure 3:
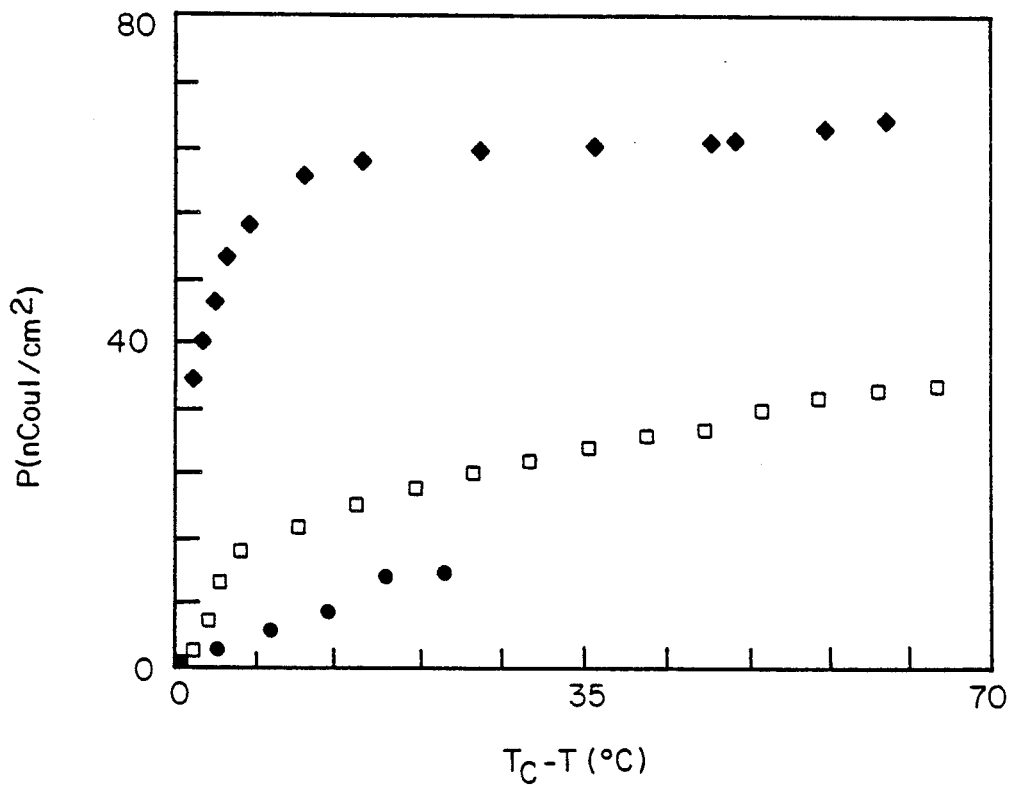
FIG. 3 is a graph of the temperature dependence of Polarization (P) for W249 (closed diamonds) a 1:4 (W249:W82) mixture (closed circles) and a 1:1 (W249:W82) mixture (open squares).
Figure 4:
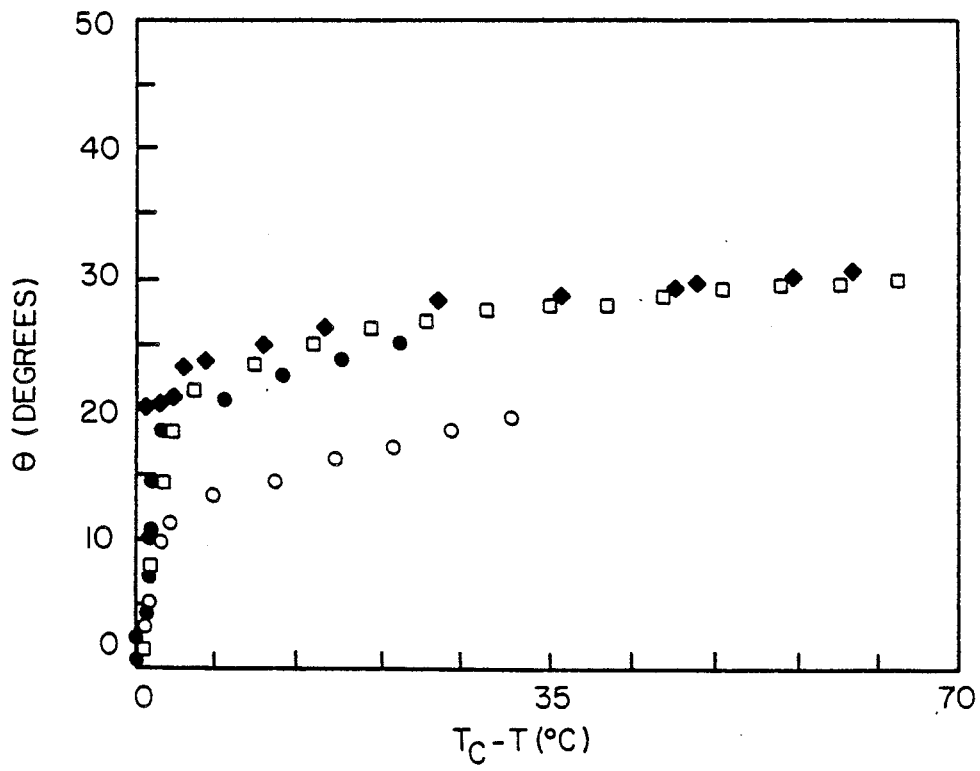
FIG. 4 is a graph of the temperature dependence of tilt angle $\theta$ for W82 (open circles), a 1:4 (W249:W82) mixture (closed circles), a 1:1 (W249:W82) mixture (open squares) and W249 (closed diamonds).

Typical variation of tilt angle $\theta$ and polarization P with temperature are shown in FIG. 3 and 4, respectively, for pure W249, W82 and their mixtures (1:4) and (1:1) given in Table 1. Table 1 provides the phase diagrams and P of W249, W82 and several mixtures.

TABLE I

Polarization P and Phase Transition Temperatures for Mixtures of W249 and W82. X is the crystal phase and $B_x k$ is hexatic smectic B phase.

| Material | P (nC · cm$^{-2}$) | Phase Diagram |
|---|---|---|
| W82 | −0.4 | I 75 A 72.8 C* 32 $B_x$ 24 X |
| W249 + W82 (1:4) | +11 | I 81.2 A 75.6 C* 49.3 $B_x$ 32 X |
| W249 + W82 (1:1) glass | +33 | I 113.4 A 108.1 C* 49.5 |
| W249 | +66 | I 146.2 C* 85 glass |

For pure W249, tilt angle ($\theta$) stays almost constant at ~29.5. over a large temperature range and drops only slightly near the first order I-C* transition. For W82 and its mixtures with W249 which show an A phase above the C* phase, $\theta$ drops continuously to zero near the A-C* transition temperature ($T_c$) indicative of a second order A-C* transition. In FIG. 4, $T_c$ for W249 is the I-C* transition temperature. There is a jump in even for lower concentrations of W249. For example, at $T_c-T=21.0°$ C., $\theta$ jumps from 16.5. for 100% W82 to 26.2° for a 20% mixture of W249 in W82. Further increase in W249 concentration does not significantly change $\theta$ as is evident from the fact that the saturation value of $\theta$ for pure W249 is 31.0°.

The temperature variation of P for W249 and its 20% and 50% mixtures with W82 is shown in FIG. 3. Since W82 is only weakly ferroelectric, independent measurement of its polarization has not been possible and the saturated value of its polarization has been determined by extrapolation of polarization in various mixtures. The polarization of W82 is P (extrapolated)$=-1$ nC/cm$^2$. It is also seen in FIG. 3 that whereas P for W249-W82 mixtures falls continuously to zero at $T_c-T^*=0°$ C. for pure W249, P drops only slightly near the I-C* transition temperature.

Figure 5A:
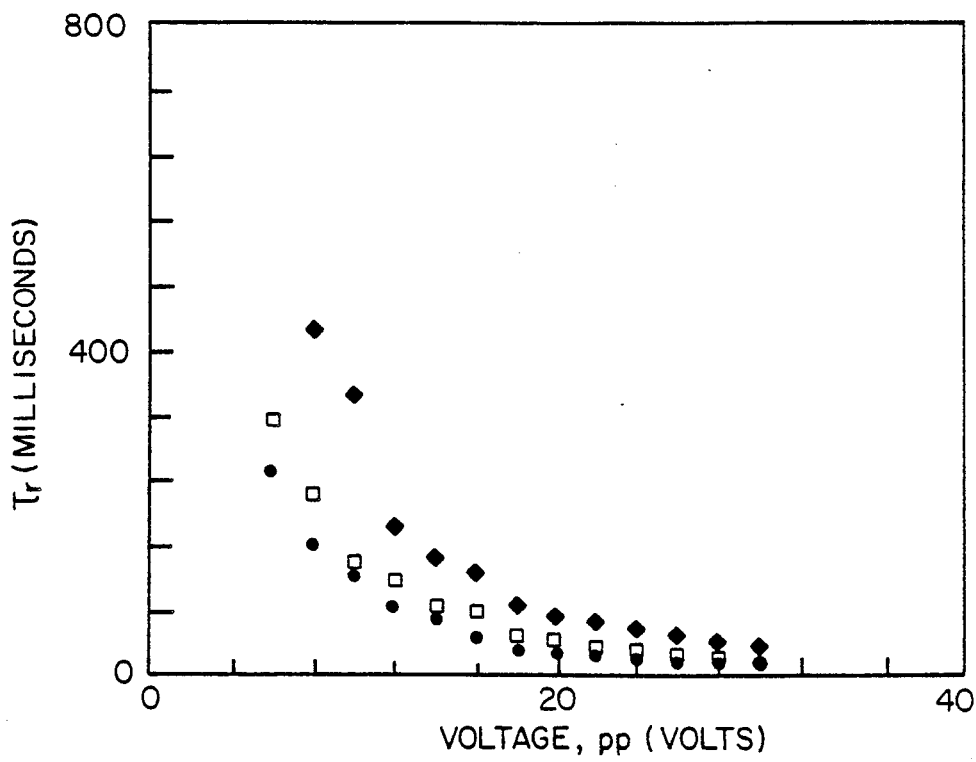
FIG. 5 (a and b) are graphs of the variation of rise time and delay times, respectively as a function of applied voltage for a 3$\mu$m thick sample of W249 at three temperatures: 135° C. (closed circles), 130° C. (open squares), and 120° C. (closed diamonds).
Figure 5B:
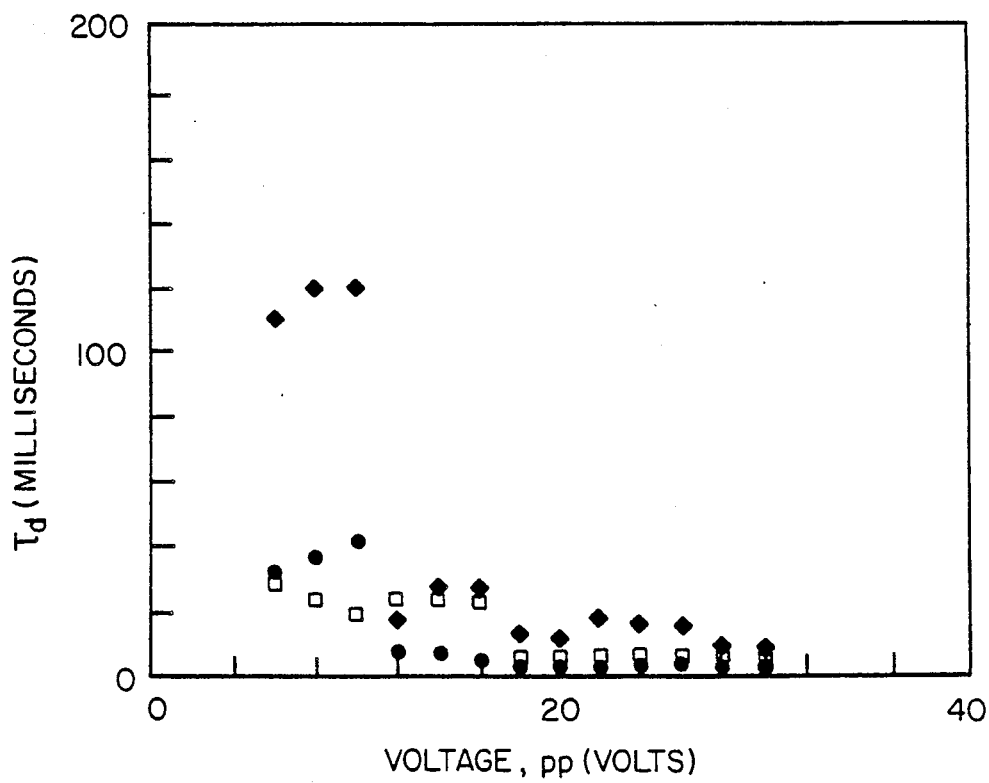

The polarization of mixtures of W249 in W82 varies linearly with W249 concentration as is indicated in FIG. 5.

RESPONSE TIME MEASUREMENTS

Figure 7:
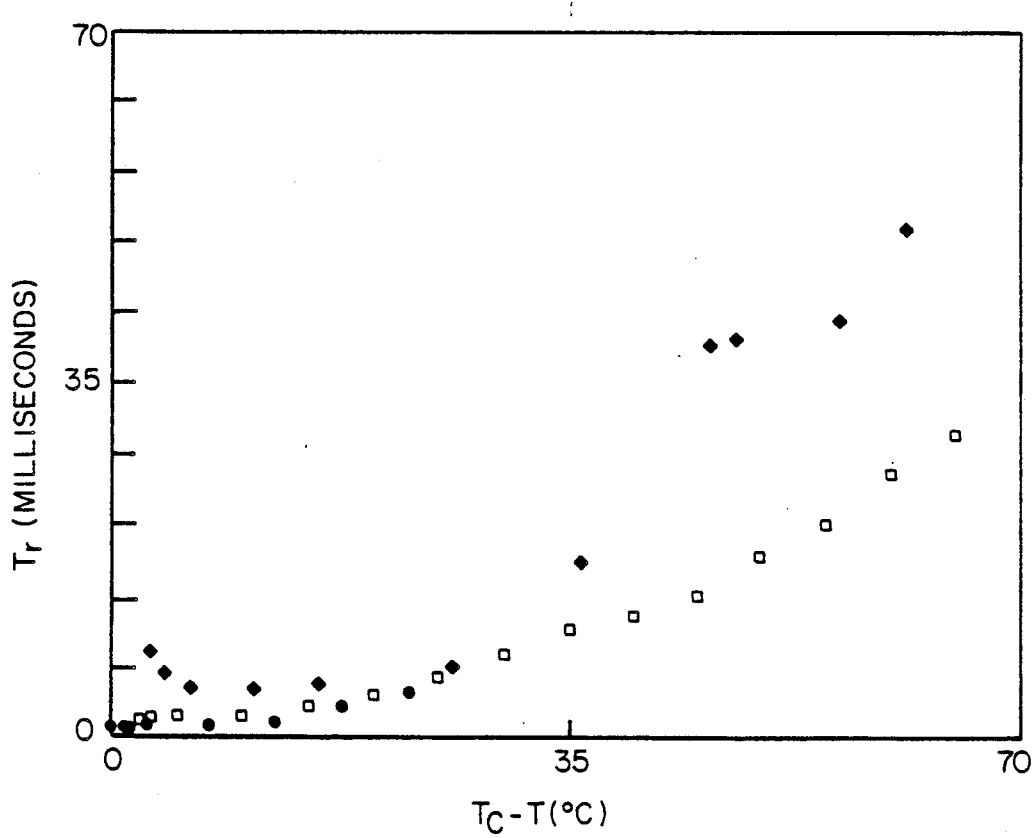
FIG. 7 is a graph of rise timer in msec vs. Tc-T for W249 and several W249:W82 mixtures: W249 (closed diamonds), 1:1 W249:W82 (open squares), and 1:4 W249:W82 (closed circles).

Optical response of W249 and its mixtures with W82 were measured as described in Example 11. The optical response signal for W249 is symmetrical with respect to the direction of application of the electric field. Similar responses were obtained for all the mixtures examined. Symmetry of the optical response curve indicates that the smectic C* layers are approximately normal to the electrode plates (Xue, J. et al. (1987) Liq. Cryst. 2:707) in W249. No significant layer tilt is indicated by these results. A plot of the rise time vs. applied field shows a linear relationship. Thus, the equation $\tau_r=\eta/PE$ appears to hold for polymer liquid crystals as well as monomeric LCs. The rise time vs. applied field data is presented as a log-log plot due to the large range of data values. For a fixed applied field of $\sim 1.5 \times 10^7$ V/m, $\tau_r$ was measured as a function of temperature for W249 and several W249/W82 mixtures. The results are shown in FIG. 7.

The following examples are presented to illustrate the invention and are in no way intended to limit the scope of the invention.

EXAMPLES

Example 1: Preparation of Mesogenic EpoxyPhenylbenzoate Alkenes

The 4-[(S,S)-2,3-epoxyalkoxy]phenyl-4-($\omega$-alkenyloxy)benzoates are prepared by coupling of 4-[(S,S)-2,3-epoxyalkyloxy)phenol with 4-($\omega$-alkenyloxy)benzoyl chloride promoted by triethylamine/ DMAP (dimethylaminopyridine). The synthesis of entaniomerically enriched (S,S) epoxyphenol is provided, for example, in Walba and Vohra U.S. Pat. No. 4,705,874. The R,R epoxyphenol is prepared by analogous methods. The synthesis of the epoxyphenylbenzoate alkene is illustrated by the synthesis of 4-[(S,S)-2,3-epoxyhexyloxy]-phenyl-4-($\omega$-decenyloxy)benzoate. This compound has been designated MDW130.

4-[(S,S)-2,3-epoxyhexyloxy]phenyl-4-($\omega$-decenyloxy)benzoate has the following phase diagram:

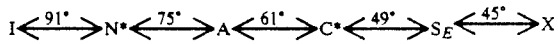

$P = +28$ nC/cm$^2$, with a tilt angle ($\Theta$) of 18°, and $\tau = 12$ $\mu$sec at 50° C.

$P= +28$ nC/cm$^2$, with a tilt angle ($\theta$) of 18°, and $\tau=12$ $\mu$sec at 50° C.

Example 2: Preparation of Polysiloxane FLC Polymers with Epoxyphenylbenzoate Mesogenic Groups Mesogen derivatized organosiloxane polymers are prepared by hydrosilyation of the 4-[(S,S)-2,3-epoxyalkoxy]phenyl-4-($\omega$-alkenyloxy)benzoates with polyalkylhydrosiloxanes essentially as described in Keller, P. (1988) Ferroelectrics 85:425 and Suzuki et al. (1988) Makromol. Chem., Rapid Commun. 39:755. The method is specifically described for hydrosilyation of MDW130 with polymethylsiloxanes.

Polymethylhydrosiloxane (Average Degree of Polarization (DP)=about 78; MW range 4500-5000) is available commercially (Petrarch Systems, Inc. Bristol, Pa., Cat. No. PS 122) or can be prepared using well-known methods. MDW130 (0.93 g, 2 mmol) is combined with 0.1 g (0.021 mmol, using average MWt of 4750) of the polymethylhydrosiloxane at room temperature under an inert atmosphere (Argon). The alkene is employed in from about 10%-20% molar excess over available Si—H groups in siloxane. The mixture is heated to 80° C. and a 200 μl of solution of dicyclopentadienylplatinum (II) chloride (0.5 μmol) in $CH_2Cl_2$ (1 mg/ml). The reaction mixture is heated at 80° C. under argon for about 48 h or until complete reaction of Si—H groups in the polysiloxane is achieved. Completeness of reaction can be assessed, for example, by IR spectroscopy following the disappearance of the Si—H absorption band at 2140 cm$^{-1}$. After reaction is complete, the mixture is cooled and it poured into 50 ml of methanol. The resulting white precipitated polymer is collected by filtration. The polymer is then further purified by several reprecipitations from THF solution into methanol. After precipitation, the polymer is dried under vacuum. The substitution ratio of the alkene-derived mesogen side chain to polymer main chain is determined by integration of the NMR signal due to residual SiH protons relative to side chain protons using a 300 MHz $^1$H NMR (CDCl$_3$; δSiH=6.75 ppm) to exceed 98%. The polymethylsiloxane (DP 78) derivitized with (4-[(S,S)-2,3-epoxyhexyloxy]phenyl-4(ω-decenyloxy)benzoate (I, where m=78, R=CH$_3$, and R$_1$=R$_2$=chiral mesogenic group with X=—COO—, x=1, n=10 and R$_3$=C$_3$H$_7$) is designated W249 herein.

W249 has the following phase diagram:

W249 has the following phase diagram:

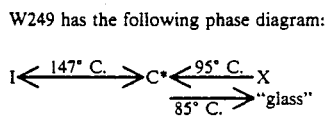

with P=+65.8 nC/cm$^2$ at 85° C. (T−Tc=−62°), θ=32° and r=3 msec (15 V/μm driving field).

Polymethylsiloxanes (DP=23, cal. MWt=1542, Petratch systems, Inc. cat No. PS119) derivitized with the enantiomerically enriched epoxyphenylbenzoates are prepared in a similar manner to W249. The polymethylsiloxane (DP=23) derivitized with (4-[(S,S)-2,3-epoxyhexyloxy]phenyl-4-(ω-decenyloxy)benzoate (I, where m=23, R=CH$_3$, and R$_1$=R$_2$=chiral epoxide mesogenic group with X=—COO—, x−1, n=10 and R$_3$=C$_3$H$_7$) is designated W251 herein. W251 has essentially the same phase diagram and polarization as W249, but is considerably less viscous than W249.

Example 3: Preparation of Copolysiloxane FLC Polymers with Epoxyohenylbenzoate Mesogenic and Alkyl Side-Chain Groups Chiral epoxyphenylbenzoate derivatized polysiloxane copolymers are prepared in a manner analogous to that detailed in Example 2 by hydrosilyation of the 4-[(S,S)-2,3-epoxyalkoxy]phenyl-4-(ω-alkenyloxy)benzoates with polyalkylhydrodialkylsiloxane copolymers. The method is illustrated by the preparation of a 4-[(S,S)-2,3-epoxyhexyloxy]phenyl-4-(ω-decenyloxy)benzoate-derivitized copolymer.

Siloxane copolymers, such as polymethylhydro-(65%-70%) dimethylsiloxane copolymer (DP=about 27; MWt range=2000-2100) are commercially available (Petrarch Systems, Inc, cat. No. PS 123) or can be readily prepared by known methods. MDW130 (about 0.3 g, 2 mmol) is combined with 0.1 g (0.05 mmol) of the copolymer at room temperature under an inert atmosphere (Argon). The amount of nonracemic alkene employed is such that complete reaction with SiH groups is obtained. The mixture is heated to 80° C. and a 200 μl of a solution of dicyclopentadienylplatinum (II) chloride (0.5 μmol) in $CH_2Cl_2$ (1 mg/ml). The reaction mixture is heated at 80° C. under argon for about 48 h, or until the hydrosilyation is complete. After the mixture is cooled, it is poured into methanol resulting in a white precipitate. The white precipitated polymer is collected by filtration. The polymer is then further purified by several reprecipitations from THF solution into methanol. After precipitation, the polymer is dried under vacuum. The substitution ratio of the alkene-derived mesogen sidechain to polymer main chain is determined by integration of the NMR signal due to residual SiH protons relative to side chain protons using a 300 MHz $^1$H NMR. After complete hydrosilyation the copolymer contains chiral mesogen and methyl side chain groups, the mesogen being present on about 30-35% of the internal silicons. The resultant polymer has a smectic C phase, has a P that is high analogous to W249 but is less viscous than W249.

Example 4: Preparation of Linear Polysiloxanes FLCs Copolymers Incorporating Two or More Different Mesogenic Groups Linear polysiloxane copolymer FLCs derivitized with more than one kind of mesogenic group can be prepared by in at least two ways: (1) hydrosilyation of a mixture of different mesogenic alkenes with polyhydroalkylsiloxane polymer or copolymer or (2) a stepwise reaction of the polyhydroalkylsiloxane polymer or copolymer with the different mesogenic alkenes. Method is particularly useful when the mesogenic alkenes have similarly reactivity with the Si—H group. In this case, a mixture of the mesogenic alkenes is prepared such that each alkene is present in the mixture in the molar ratio that is desired in the product FLC polysiloxane. The mixture of alkenes is then hydrosilyated essentially as described in Example 2. The percent substitution of the polysiloxane by each of the different mesogens can be determined by conventional methods of organic analysis (e.g. NMR spectroscopy). A bias for or against any particular mesogenic alkene can be compensated for by adjusting the molar ratios of the alkenes in the starting mixture. Method 2 is particularly useful with mesogenic alkenes which have significantly different reactivity with the Si—H group. In this case, the polyhydrogenorganosiloxane is combined with a molar amount of one the mesogenic alkenes which will give the desired substitution ratio in the polysiloxane product and the reaction is allowed to proceed to completion. A second mesogenic alkene is then added to the reaction mixture. The amount of the second alkene added is that required to achieve a desired substitution ratio. Additional alkenes can, if desired, be reacted with the polyhydroalkylsiloxane until essentially all of the Si—H groups are derivitized with mesogenic groups. When method 2 is used, it is preferred that less reactive alkenes are reacted with the polyhydroalkylsiloxane polymer or copolymer before more reactive alkenes. Method 1 is illustrated herein by the preparation of the copolymer poly-(90%)-methyl-ω-[-4-decyloxy-4'-

[(S,S)-2,3-epoxyhexyloxy]phenylbenzoate]—(10%)-methyl-ω-[4-decyloxy-4′-[(S)-4-methylhexyl]phenylbenzoate]siloxane.

A 1 9 molar ratio of 4-[(S)-4-methylhexyl]phenyl-4-(ω-decenyloxy)benzoate and 4-[(S,S)-2,3-epoxyalkoxy]-phenyl-4-(ω-decenyloxy)benzoate mixture was hydrosilyated with polymethylhydrosilane (average degree of polymerization=11.5) essentially as described in Example 2. The resultant copolymer, herein designated W253, displays a smectic C* phase.

Example 5: Preparation of Cyclic polysiloxane FLCs with Epoxyohenylbenzoate Mesogenic Groups Chiral epoxyphenylbenzoate derivatized cyclic polysiloxanes are prepared in a manner analogous to that detailed in Example 2 by hydrosilyation of the 4-[(S,S)-2,3-epoxyalkoxy]phenyl-4-(ω-alkenyloxy)benzoates with cyclic polysiloxanes. The method is illustrated by the preparation of a 4-[(S,S)-2,3-epoxyhexyloxy]phenyl-4-(ω-decenyloxy)benzoate-derivitized cyclicpolysiloxane.

Cyclic polysiloxanes, such as cyclopolymethylsiloxanes having 3-7 silicons/ring are commercially available (Petrarch Systems, Inc) or can be readily prepared by known methods (see, for example, Crivello, J. V. and Lee, J. L (1988) Chemistry of Materials 1:445–451). Specifically, 2,4,6,8-tetramethylcyclotetrasiloxane, with four silicons/ring is available in purified form (Petrarch Systems, Inc.) MDW130 (about 0.96 g, 2 mmol) is combined with 0.1 g (0.5 mmol) of the copolymer at room temperature under an inert atmosphere (Argon). The amount of nonracemic alkene employed is such that complete reaction with SiH groups is obtained. The mixture is heated to 80° C. and a 200 μl of a solution of dicyclopentadienylplatinum (II) chloride (0.5 mmol) in $CH_2Cl_2$ (1 mg/ml). The reaction mixture is heated at 80° C. under argon for about 48 h, or until the hydrosilyation is complete. After the mixture is cooled, the derivitized cyclic polysiloxane is precipitated. The resulting precipitated cyclic polysiloxane is collected by filtration and is then further purified by several reprecipitations. After precipitation, the material is dried under vacuum. The substitution ratio of the alkene-derived mesogen side chain to polymer main chain is determined by integration of the NMR signal due to residual SiH protons relative to side chain protons using a 300 MHz $^1$H NMR. The cyclic polysiloxane tetra 4-[(S,S)-2,3-epoxyhexyloxy]phenyl-4-(ω-decenyloxy)benzoate-derivitized2,4,6,8-tetramethylcyclotetrasiloxane displays a smectic C* phase and has high P.

Example 6: Preparation of Mesogenic Epoxybiphenyl Alkenes

Chiral nonracemic epoxyalkeneoxybiphenyls are prepared using methods analogous to those described in Walba and Vohra U.S. Pat. Nos. 4,638,073 and 4,605,874. Specifically, 4-[(S,S)-2,3-epoxyalkoxy]-4′-(ω-alkenyloxy)biphenyls are prepared by coupling of a p-(ω-alkenyloxy)biphenylcarboxylic acid with a chiral nonracemic (2S,3S)epoxyalcohol in the presence of triphenylphospine and diethyl azodicarboxylate.

Example 7: Preparation of Linear Polysiloxane FLC Polymers and Cyclic Polysiloxane FLCs with Epoxybiphenyl Mesogenic Groups Linear polysiloxane polymer and copolymer FLCs are prepared by hydrosilyation of 4-(S,S)-2,3-epoxyalkoxy-4′-(omega-alkenyloxy)biphenyls with polyalkylhydrosiloxanes and copolyalkylhydrosiloxanes essentially as described in Examples 2 and 3, respectively. The resultant mesogen derivitized polymers and copolymers display liquid crystalline phases, in particular those polymers and copolymers having a flexible spacer length of about 6 to 12 $CH_2$ groups display smectic C* phases.

Cyclic polysiloxane FLCs are prepared by hydrosilyation of 4-(S,S)-2,3-epoxyalkoxy-4′-(ω-alkenyloxy)biphenyls with cyclic polysiloxanes essentially as described in Example 4. The resultant mesogen derivitized cyclic polysiloxanes display liquid crystalline phases, in particular those polymers and copolymers having a flexible spacer length of about 6 to 12 $CH_2$ groups display smectic C* phases.

Example 8: Preparation of Mesogenic Reverse ester Epoxyphenylbenzoate Alkenes The 4-(ω-alkenyloxy)phenyl-4-[(S,S)-2,3-epoxyalkoxy]benzoates are prepared by coupling of (2S,3S)-epoxyalcohols with 4-(omega-alkenyloxy)phenyl-4-hydroxybenzoate in the presence of triphenylphosphine and diethyl azodicarboxylate by a procedure analogous to that described in Walba and Vohra U.S. Pat. Nos. 4,638,073 and 4,705,874. The chiral nonracemic epoxyalcohols are prepared using known methods, for example, those described in U.S. Pat. Nos. 4,638,073 and 4,705,874. 4-(ω-alkenyloxy)phenyl-4-hydroxybenzoates are prepared by known methods, for example, by coupling of a 4-(ω-alkenoxy)phenol with a 4-hydroxy benzoylchloride.

Example 9: Preparation of Linear Polysiloxane FLC Polymers and Cyclic Polysiloxane FLCs with Reverse Ester Epoxyphenylbenzoate Mesogenic Groups Linear polysiloxane polymer and copolymer FLCs are prepared by hydrosilyation of 4-(ω-alkenyloxy)phenyl-4-[(S,S)-2,3-epoxy alkoxy]benzoate with polyalkylhydrosiloxanes and copolyalkylhydrosiloxanes essentially as described in Examples 2 and 3, respectively. The resultant mesogen derivitized polymers and copolymers display liquid crystalline phases, in particular those polymers and copolymers having a flexible spacer length of about 6 to 12 $CH_2$ groups display smectic C* phases.

Cyclic polysiloxane FLCs are prepared by hydrosilyation of 4-(S,S)-2,3-epoxyalkoxy-4′-(ω-alkenyloxy)biphenyls with cyclic polysiloxanes essentially as described in Example 4. The resultant mesogen derivitized cyclic polysiloxanes display liquid crystalline phases, in particular those polymers and copolymers having a flexible spacer length of about 6 to 12 $CH_2$ groups display smectic C* phases.

Example 10: Alignment of Polysiloxane FLC's and FLC Mixtures Containing Them ITO-coated glass plates, one of which had polyamide spacers of about 3μm, were nylon surface-coated. The coated glass plates were then brushed in one direction and assembled into a cell such that the rubbing (or brushed) direction of the two surfaces were parallel. Polymer FLC W249 was heated to the isotopic phase and the cell was filled with the material. The resulting FLC cell was placed between crossed polarizer and light passage through the cell was measured. The cell did not completely extinguish light passage indicating incomplete orientation of the polymer FLC. This was true even at temperatures in which W249 was an isotopic liquid.

Isotopic W249 was introduced between ITO-coated glass plates (spaced about 3 μm) which were nylon surface-coated and brushed. The pure polymer (W249) sample was cooled from the isotropic phase and, smectic C focal conics were observed to appear below 146° C. The focal conics were observed to line up perpendicular to the direction of rubbing indicating that the layer orientation was along the rubbing direction. The focal conics grew in size as the sample was further cooled. When the sample was at or near the transition to the smectic phase, a slight shear was applied along the direction of rubbing as the sample was slowly cooled to make the focal conics grow normal to the shearing direction.

Shear was applied by movement of one of the glass plates in the desired direction. Shear was applied in one direction until optimal alignment was achieved. Application of too much shear in one direction can be compensated with application of shear in the reverse direction, along the rubbing direction, if necessary, to optimize alignment. It is, however, preferable that shear be applied in one direction. Perfect planar orientation of the FLC polymer in the cell resulted from application of shear as described. The resulting aligned FLC cell was found to be bistable and have excellent contrast. Furthermore, examination of the cell showed no zig-zag walls as are often found in such cells.

A 1:1 (by weight) mixture of W249 and W82 was introduced between ITO-coated nylon-surface coated glass plates (spacers=3μm). The coated glass plates were brushed in one direction and assembled as above. The polymer mixture was heated to the isotropic phase and introduced into the cell. On cooling into the smectic phase, focal conics were observed both parallel and perpendicular to the direction of rubbing of the glass plates. More focal conics appeared to be oriented perpendicular to the rubbing direction. Application of shear in the direction of rubbing as the sample cooled to the smectic phase resulted in a cell with good planar alignment with only a small number of defects seen in the form of black lines. No zig-zag wall defects were observed.

With a 1:1 mixture of W249 and W82 improved alignment perpendicular to the rubbing direction over that induced merely by contact with the rubbed surface could also be obtained by application of shear perpendicular to the rubbing direction. However, the resulting cell was inferior to that produced by application of parallel shear and zig-zag wall defects were observed. Further, alignment was more difficult to obtain in this case.

A mixture of W249 and W82 containing about 20% by weight of W249 was prepared, heated to the isotropic phase and introduced between ITO-coated, nylon-surface coated, brushed plates. In contrast to results observed with W249 and the 1:1 (W249:W82) mixture, on cooling of the mixture smectic A layers were observed to form perpendicular to the rubbing direction. Alignment of the sample perpendicular to the rubbing direction was achieved by application of shear perpendicular to the direction of rubbing. However, the resulting cell exhibited zig-zag defects commonly observed in monomer FLC cells.

Example 11: Polarization, Tilt Angle and Response Time Measurements

The FLC material in the smectic C* phase was sandwiched between two ITO-coated glass plates on which a very thin nylon film was deposited and the surfaces were brushed parallel to the plates. The plates were separated by a ~3μm thick polyamide spacer deposited on one of the plates. The area of the ITO electrode was 1.17 cm$^2$. A typical sample geometry for an FLC cell is given in FIG. 2.

Tilt angle $\theta$ was measured as a function of temperature by determining the angle between the two stable states of the cell switched by application of an electric field. For a given direction of the field, the smectic C* director was positioned along one of the polarization directions of the crossed polarizer of the optical microscope. When oriented in this way the cell extinguishes. The electric field is then reversed and depending on the sign of polarization, the sample is rotated so that the director lines up along the same polarization direction. The angle between these two director orientations is twice the tilt angle $\theta$. The variation in tilt angle with temperature for W249 and several mixtures with W82 are given in FIG. 4.

The polarization P was measured by integration of the polarization current peak observed during the application of a triangular wave field, typically 30 V peak to peak. The current peak is integrated with the help of the storage oscilloscope and a computer. The variation of with temperatures for W249 and several mixtures with W82 are given in FIG. 3.

Optical response was measured using a polarizing microscopy and an associated photo detector arrangement. A step voltage (−15 V to +15 V) was applied to the FLC cell to measure the optical response time.

By changing the magnitude of the applied voltage, the time for 10% to 90% rise in intensity of the transmitted light (defined here as rise time $\tau_r$) and rise time variation with applied field at different temperatures for W249 was measured. The delay time $\tau_d$ defined as the time for the first 10% rise in transmitted light intensity at the same temperatures was also measured.

Figure 6:
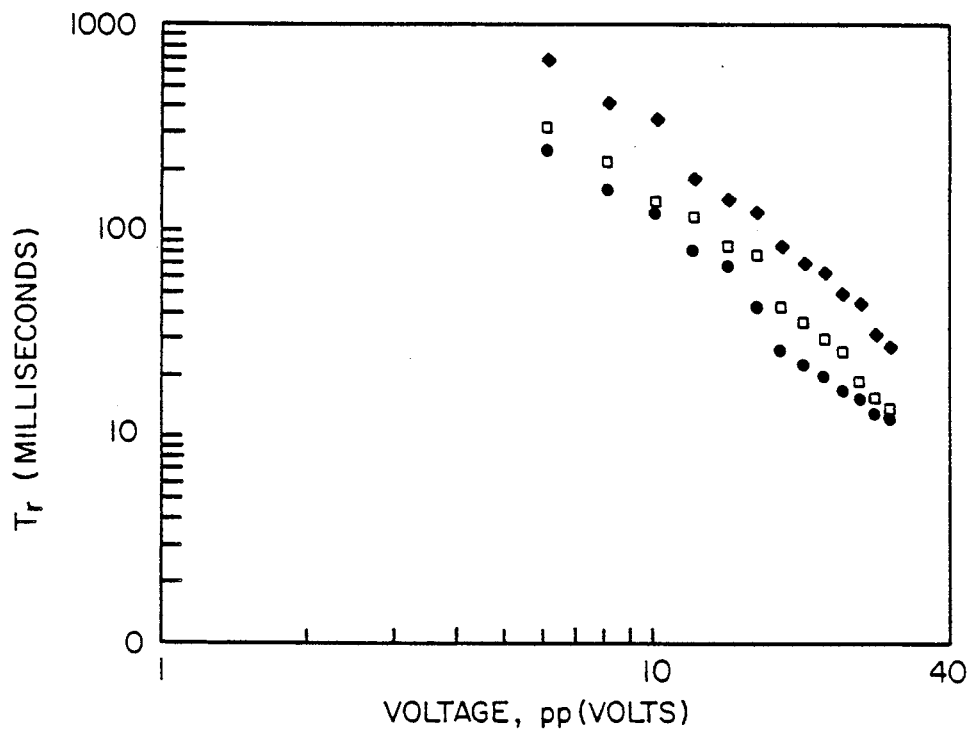
FIG. 6 is a log-log plot of rise time as a function of voltage for W249 at three temperatures: 135° C. (closed circles) 130° C. (open squares), and 120° C. (closed diamonds).

The results of these measurements, rise time and delay times (respectively), vs. applied field for W249 at several temperatures are presented in FIGS. 5 a and b. A log-log plot of rise time vs. voltage is for W249 at the same temperatures is given in FIG. 6. In addition, Tr was measured as a function of temperature for W249 and the 1:4 and 1:1 W249:W82 mixtures. The results are presented in FIG. 7. In these cases a fixed field of ~1.5×10 $^7$V/M was applied to the cells.

The present invention has been illustrated herein by presentation of the foregoing examples. It will be readily apparent to those of ordinary skill in the art that alternate procedures and equivalent reagents can be employed. Examples of a single enantiomer only may have been provided. It is well understood that the other enantiomer is functionally equivalent with respect to FLC properties. The polarization of the enantiomers will be equal in magnitude and opposite in size. Thus, the present invention includes both enantiomers. The present invention includes also mixtures of enantiomers which are nonracemic, i.e., in which one of the enantiomers is in excess.

We claim:

1. A polysiloxane having chiral nonracemic mesogenic side chains which polysiloxane has the formula:

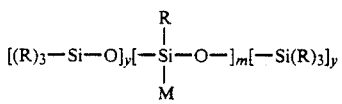

wherein R is an alkyl group having from 1 to 3 carbon atoms; y is either 0 or 1 and when y=0, m is a number ranging from about 10 to about 100 and when y=1, m is an integer ranging from about 4 to about 10 and wherein M is a chiral nonracemic mesogenic group having the formula:

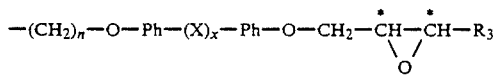

where x is 0 or 1 and X is —OOC— or —COO—; Ph is a 1,4 substituted phenyl group; n is an integer from about 6 to 12; and $R_3$ is a straight chain or branched alkyl group having six or less carbon atoms and "*" indicates an asymmetric carbon.

2. The polysiloxane of claim 1 wherein y=0.
3. The polysiloxane of claim 2 wherein the configuration of the mesogenic group is 2S, 3S or 2R, 3R.
4. The polysiloxane of claim 3 wherein x=1 and X=COO.
5. The polysiloxane of claim 4 wherein n is 10.
6. The polysiloxane of claim 5 wherein $R_3$ is n-propyl.
7. The polysiloxane of claim 2 wherein R is $CH_3$.
8. The polysiloxane of claim 1 wherein y=1.
9. The polysiloxane of claim 8 wherein m is a number ranging from about 25 to about 80.
10. The polysiloxane of claim 9 wherein the configuration of the mesogenic group is 2S, 3S or 2R, 3R.
11. The polysiloxane of claim 10 wherein x=1 and X=COO.
12. The polysiloxane of claim 11 wherein n=10.
13. The polysiloxane of claim 12 wherein $R_3$ is n-propyl.
14. A polysiloxane copolymer having chiral nonracemic side chains which polysiloxane copolymer has the formula:

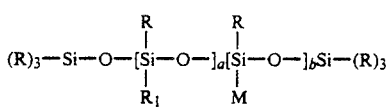

where R is an alkyl group having three carbons or less carbon atoms and $R_1$ is a side chain group selected from the group consisting of a straight-chain alkyl group having from one to about six carbon atoms and a mesogenic group, different from M, which is optionally a chiral nonracemic mesogenic group; a and b are numbers greater than 0 wherein a+b, the average degree of polarization, ranges from about 10 to about 100, and wherein b/(a+b), which represents the degree of substitution by M, is at least about 0.05 and M is a chiral nonracemic mesogenic group having the formula:

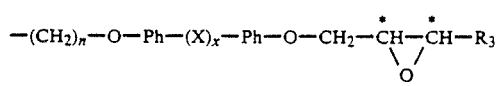

wherein x is 0 or 1 and X is —OOC— or —COO—; Ph is a 1,4 substituted phenyl group; n is an integer from about 6 to 12; $R_3$ is a straight chain or branched alkyl group having six or less carbon atoms and "*" indicates an asymmetric carbon.

15. The polysiloxane of claim 14 wherein b/(a+b) is at least about 0.1.
16. The polysiloxane of claim 14 wherein a+b ranges from about 20 to about 80.
17. The polysiloxane of claim 14 wherein b/(a+b) is at least about 0.05.
18. The polysiloxane of claim 15 wherein b/(a+b) is at least about 0.35.
19. The polysiloxane of claim 14 wherein R is a methyl group.
20. The polysiloxane of claim 19 wherein $R_1$ is a methyl group.
21. The polysiloxane of claim 20 wherein a+b range from about 20 to about 80.
22. The polysiloxane of claim 21 wherein b/(a+b) is at least about 0.1.
23. The polysiloxane of claim 21 wherein b/(a+b) is at least about 0.35.
24. The polysiloxane of claim 23 wherein x=1 and X=COO.
25. The polysiloxane of claim 24 wherein n=10.
26. The polysiloxane of claim 25 wherein $R_3$=n-propyl.
27. The polysiloxane of claim 14 wherein $R_1$ is a mesogenic group that is not M.
28. The polysiloxane of claim 27 wherein $R_1$ is a chiral nonracemic mesogenic group.
29. The polysiloxane of claim 27 wherein x=1 and X=COO and wherein $R_1$ is a chiral nonracemic mesogenic phenylbenzoate that is not M.
30. The polysiloxane of claim 29 wherein $R_1$ is an omega-[4-decyloxy-4'-[(S)-4-methylheptyl]phenylbenzoate]group.
31. The polysiloxane of claim 14 wherein a+b is about 25.
32. The polysiloxane of claim 14 wherein a+b is about 80.
33. An FLC polysiloxane which has the formula:

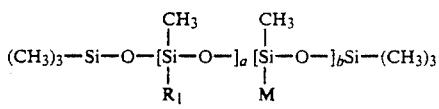

wherein $R_1$ is a side chain group selected from the group consisting of a straight-chain alkyl group having from one to about six carbon atoms and a mesogenic group, different from M, which is optionally a chiral nonracemic mesogenic group; a and b are numbers greater than 0 wherein a+b, the average degree of polarization, ranges from about 10 to about 100, and wherein b/(a+b), which represents the degree of substitution by M, is at least about 0.05 and M is a chiral nonracemic mesogenic group having the formula:

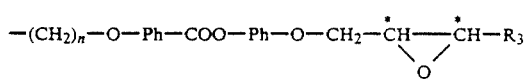

where Ph is a 1,4 substituted phenyl group; n is an integer from about 6 to 12; $R_3$ is a straight chain or branched alkyl group having six or less carbon atoms and "*" indicates an asymmetric carbon.

34. The polysiloxane of claim 33 wherein the configuration of the asymmetric carbons in M is 2S, 3S or 2R, 3R.

35. The polysiloxane of claim 34 wherein $R_1$ is a methyl group.

36. The polysiloxane of claim 35 wherein $b/(a+b)$ is at least about 0.1.

37. The polysiloxane of claim 35 wherein $b/(a+b)$ is at least about 0.35.

38. The polysiloxane of claim 34 wherein $R_1$ is a mesogenic group that is not M.

39. The polysiloxane of claim 38 wherein $R_1$ is a chiral nonracemic mesogenic group that is not M.

40. The polysiloxane of claim 38 wherein $R_1$ is a mesogenic group that is a phenyl benzoate.

41. The polysiloxane of claim 34 wherein $n=10$.

42. The polysiloxane of claim 41 wherein $R_3$ is n-propyl.

* * * * *

UNITED STATES PATENT AND TRADEMARK OFFICE
CERTIFICATE OF CORRECTION

PATENT NO. : 5,138,010
DATED : August 11, 1992
INVENTOR(S) : Patrick J. Keller and David M. Walba It is certified that error appears in the above-identified patent and that said Letters Patent is hereby corrected as shown below:

At column 4, line 56, please delete "-$R_3OR_3$, or". At column 9, line 61, please insert --with M =-- before the formula. At column 11, line 41, please rewrite "timer in" as --time ($\tau_r$) in--. At column 15, line 54, please rewrite "in even" as --in θ even--. At column 17, line 29, please rewrite "(DP 78)" as --(DP=78)--. At column 19, line 4, please rewrite "1 9" as --1:9--.

Signed and Sealed this

Eighteenth Day of January, 1994

Attest:

BRUCE LEHMAN

Attesting Officer        Commissioner of Patents and Trademarks